Jan. 16, 1968  J. R. JOHNSON  3,363,546
CONTAINER DECORATING MEANS WITH MEANS
FOR HOLDING AND INDEXING WORK
Filed Oct. 16, 1962  5 Sheets-Sheet 1
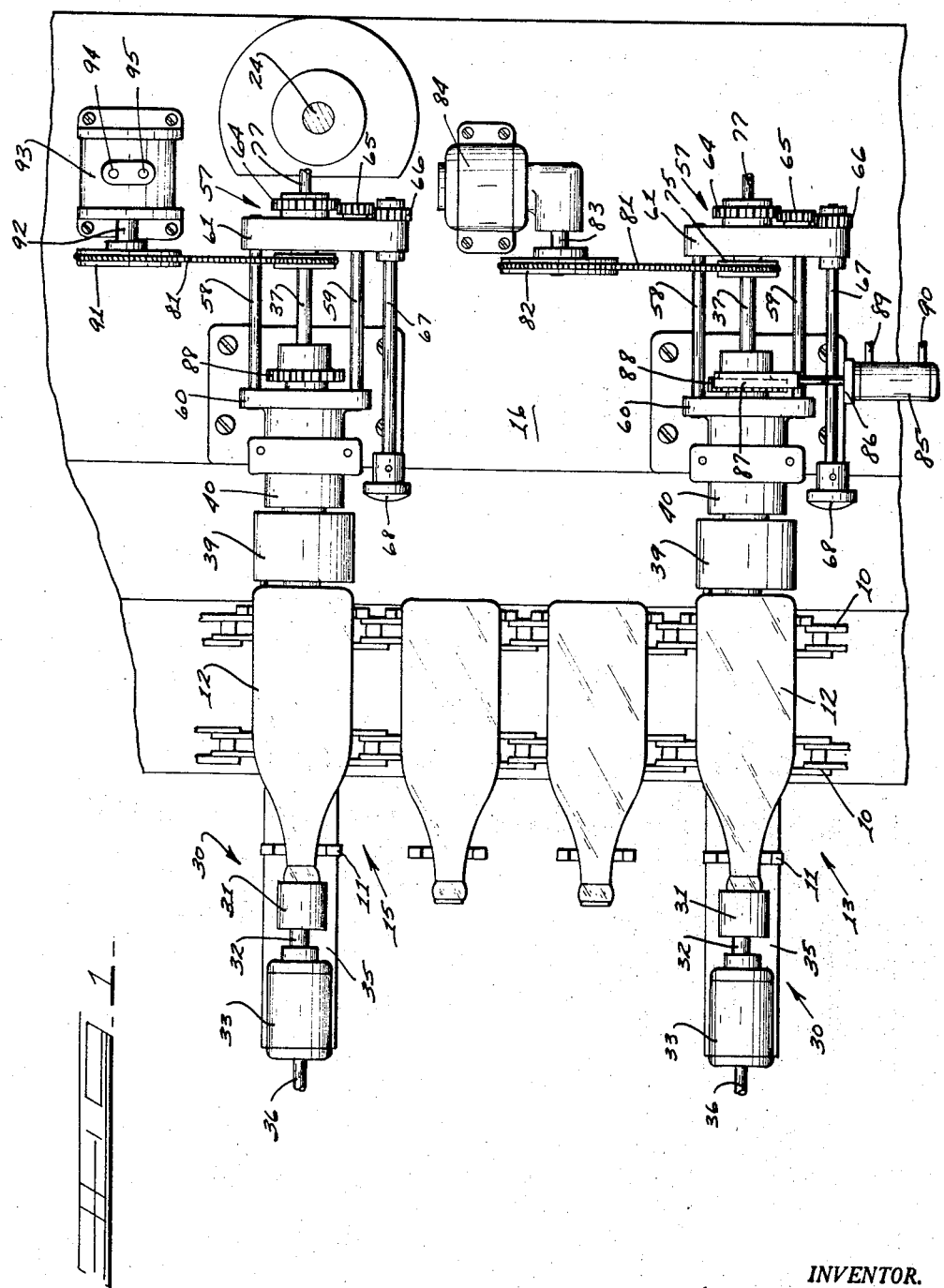
INVENTOR.
JOHN R. JOHNSON
BY
J. R. Nelson and
W. A. Scheich
ATTORNEYS

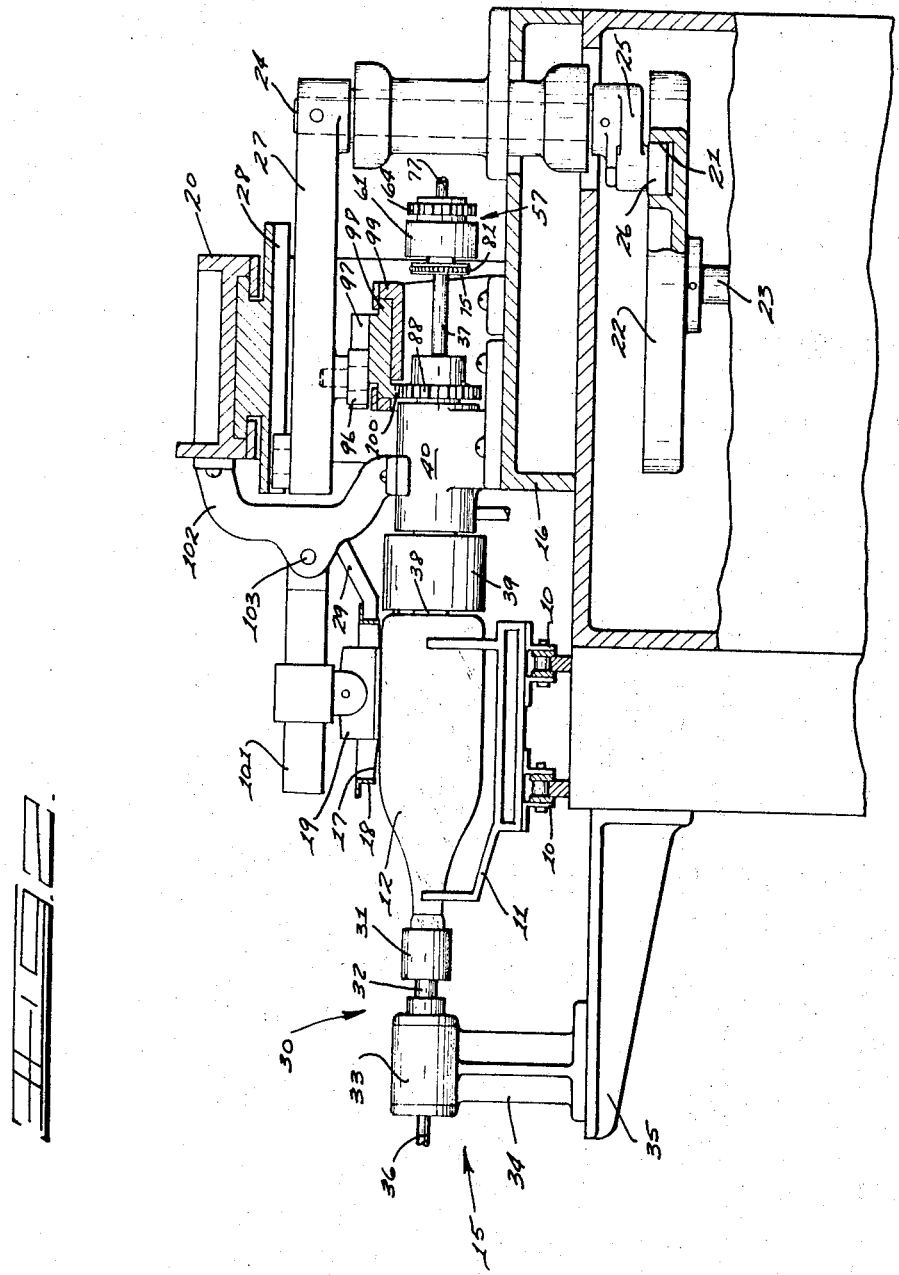

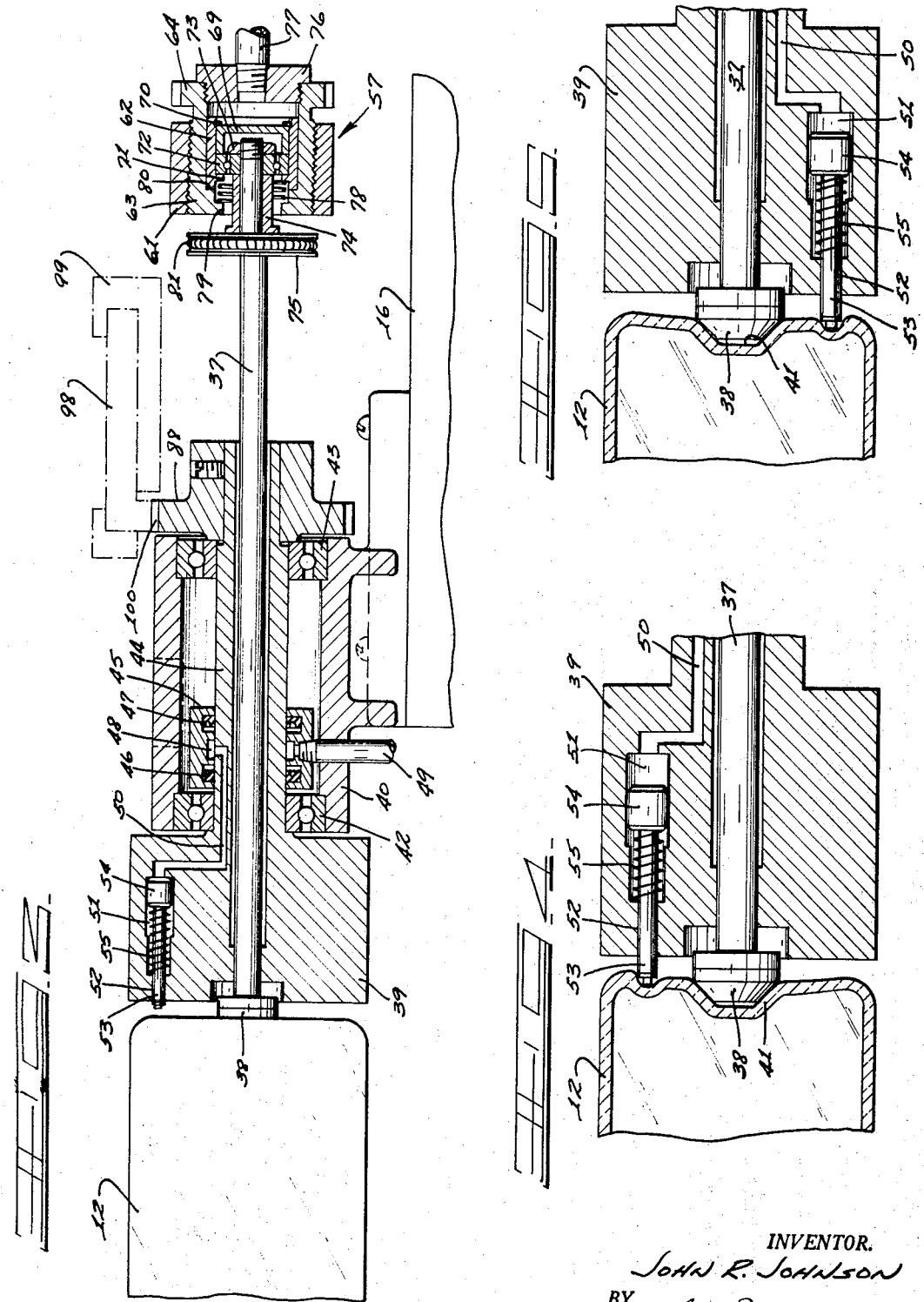

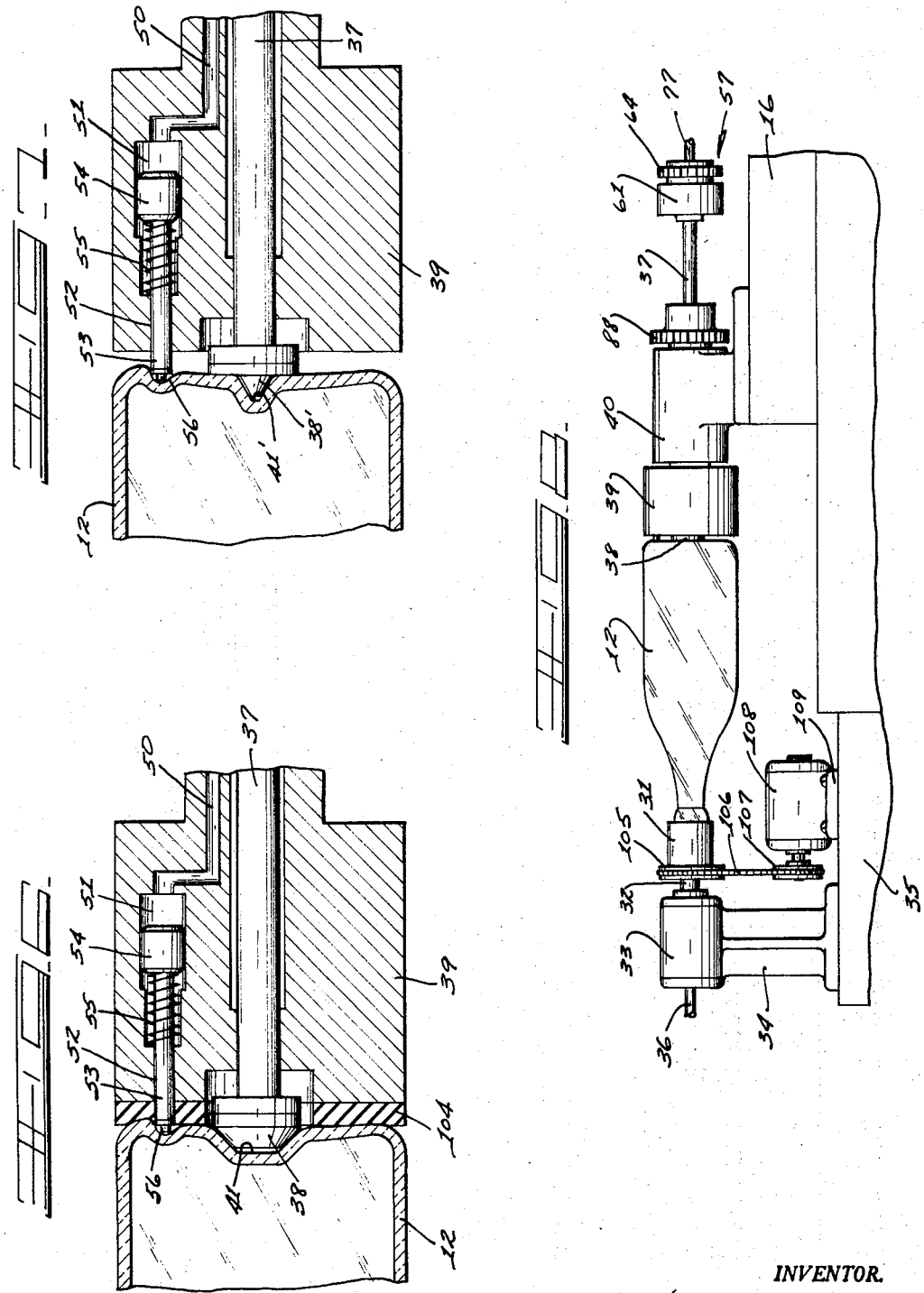

Jan. 16, 1968   J. R. JOHNSON   3,363,546
CONTAINER DECORATING MEANS WITH MEANS
FOR HOLDING AND INDEXING WORK
Filed Oct. 16, 1962   5 Sheets-Sheet 5
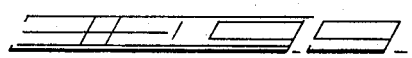
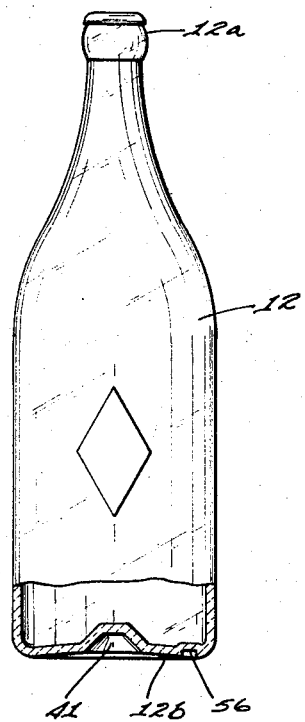
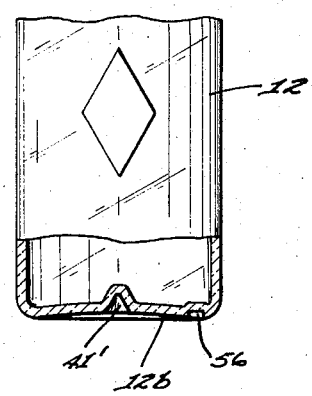
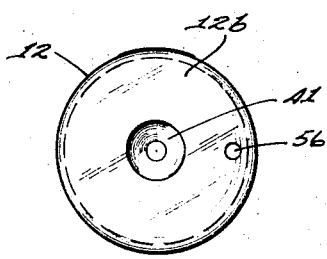
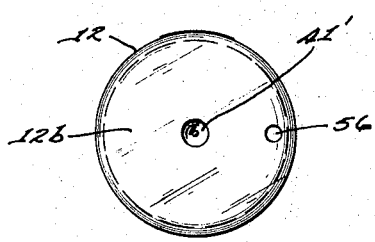
INVENTOR.
JOHN R. JOHNSON
BY
J. R. Nelson and
W. A. Schauch
ATTORNEYS

United States Patent Office 3,363,546
Patented Jan. 16, 1968

3,363,546
CONTAINER DECORATING MEANS WITH MEANS FOR HOLDING AND INDEXING WORK
John R. Johnson, Toledo, Ohio, assignor to Owens-Illinois Inc., a corporation of Ohio
Filed Oct. 16, 1962, Ser. No. 230,914
8 Claims. (Cl. 101—38)

The present invention relates to machines for applying color decorations to articles of revolution, such as glass bottles, jars and the like; and, particularly relates to an improved handling mechanism for obtaining a predetermined orientation of the article prior to applying the decoration by the known stencil process.

In prior machines, the bottles have been supported in opposed end elements as a neck chuck and a conforming base chuck. A device has been provided for engaging a bottom indicia on the bottle to rotatably orient it in a desired position with respect to the stencil decorating screen. The conforming base chuck is of such construction that it interferes with application of the decoration near the heel or bottom edge at the side of the bottle.

It is, therefore, one of the objects of the present invention to provide apparatus for supporting and orienting or registering an article to be decorated, such as a bottle, that will permit decoration up to the heel or bottom edge of the bottle side wall.

Another object of the invention is to provide a novel apparatus for handling articles in the decorating process for accurately and rapidly registering them with the decoration applying screen bearing the pattern of the decoration.

A further object of the invention is to provide in combination novel neck and bottom support elements for an article of revolution that will obviate interference of this mechanism with the mechanism for applying the decoration.

A further object of the invention is the provision of such apparatus that is readily adaptable to use on existing stencil type decorating machines, and yet is easily maintained and has relatively fewer parts, etc.

Still another object of the invention is to provide a new form of container, such as a glass bottle, having a bottom end configuration that will adapt it for use with the decorating apparatus above outlined.

The specific nature of this invention, as well as other objects and advantages thereof, will become apparent to those skilled in the art from the following detailed description, taken in conjunction with the annexed sheets of drawings, on which, by way of preferred example only, is illustrated embodiments of this invention.

In the drawings:

FIG. 1 is a plan view of an automatic decorating machine which employs the present invention;

FIG. 2 is a sectional elevational view of the machine taken along line 2—2 of FIG. 1;

FIG. 3 is an enlarged sectional view of the apparatus of the invention employed in registering an article for decorating;

FIG. 4 is an enlarged detailed view of a portion of the apparatus of FIG. 3, showing an article in registered position;

FIG. 5 is a view similar to FIG. 4, showing the registered article during decorating;

FIG. 6 is an enlarged sectional view of another embodiment of the method;

FIG. 7 is a view like FIG. 4, showing a further embodiment of the invention;

FIG. 8 is a side elevational view of the apparatus of the invention used on the decorating machine and illustrates another embodiment of the invention;

FIG. 9 is a side elevational view of a novel bottle constructed for use with the invention and includes in detail, a lower portion broken away to illustrate shape of the bottom wall;

FIG. 10 is a view similar to FIG. 9, but shows an alternate novel form of bottle of this invention;

FIG. 11 is a bottom view of the novel bottle of FIG. 9; and

FIG. 12 is a bottom view of the novel bottle of FIG. 10.

Briefly described, the invention employs the use of a center shaft at the base of a container to be decorated. The center shaft has a truncated or conical pad fastened at its outer end. This pad will be received in a conical recess molded in the bottom wall of the bottle at the central axis thereof. The center shaft and its pad will cooperate with the neck chuck as an end support at the neck or finish to hold the bottle while rotating it for both registration of a predetermined surface area thereon and for decoration of that surface area by a squeegee-screen decorating mechanism. This will eliminate any need for the usual form of base chuck annulus or base chuck and will thereby permit decoration of the bottle near the heel edge of the side wall. Also, the center support for the bottle, just described, will provide a more positive means for holding the bottle and rotating it with respect to a registering means so as to orient the bottle for decorating.

On the drawings, the invention is shown as adapted for use on an automatic decorating machine of the type disclosed in a patent to Jackson and Heyne, No. 2,231,535. It should be understood that the mechanism of the invention herein disclosed may be readily adapted for use with other types of decorating machines. The preferred embodiment of the invention is shown herein as applied to a fully automatic machine, however, the principle hereof may well be applied to use on a semi-automatic machine of the type well-known in the industry.

FIG. 1 illustrates a machine conveyor chain 10 which supports and carries plural bottle support cradles 11. These cradles support and carry containers or bottles 12 in a horizontal attitude into a preliminary registering station, hereinafter called "pre-register," at 13. The conveyor 10 is driven intermittently so that each bottle is advanced step-by-step along the front of the decorating machine. Advanced from the pre-register station 13 is a final register and decorating station 15. Each of the bottles before they reach the decorating station are rotated automatically to such a position that proper registration of the surface area of the bottle to be decorated will be obtained with the portion of the decorating screen of the machine. The extent of this rotation will depend upon the particular rotary position of the container at the time it is deposited into a cradle 11. This automatic rotation first occurs at the pre-registering station 13 on the machine. This mechanism, as will be described hereinafter, is constructed to provide for at least a 360° rotation of the bottle 12. After such a preliminary registration, the machine advances the bottle to the decorating station 15. The decorating unit at station 15 is mounted on the supporting frame 16 of the machine (FIG. 2). The decorating screen 17 is mounted on a screen frame 18 which overlies the bottles 12 at the decorating station. The screen is advanced lengthwise while in point contact with the bottle and the bottle is simultaneously rotated by means to be presently described. The means for obtaining contact of the screen on the bottle comprises a squeegee 19 which overlies the screen and operates in a known manner to force colorant material through the design of the screen onto the bottle surface that is to be decorated. The screen frame 18 and the mechanism actuating it are supported on a longitudinal beam 20, which comprises a part of the framework of the machine. The horizontal reciprocating movement of the screen frame 18 is controlled by a cam track 21 formed in a rotary cam member 22 pivotally supported on vertical shaft 23. A vertical rock shaft 24 is provided with a rock arm 25 carrying a cam roll 26 that is in running engagement with the cam track 21. At the upper end of the rock shaft 24 is a forwardly extending rock arm 27 which has a driving connection with a slide bar 28. The arm 27 will thus drive the screen carriage which is comprised of arms 29 fastened to the screen frame 18 and supporting it in a horizontal disposition. The screen carriage moves back and forth on the guideways of the support beam 20. The screen carriage arms 29 are attached to a longitudinal slide bar that extends parallel with the carriage along the front of the machine and is not shown in detail hereon. This slide bar is mounted to reciprocate the screen frame 18.

Preliminary to the decorating station, a bottle registering device of the present invention is mounted at the pre-register station 13. As seen on FIGS. 1 and 2, this comprises a head or neck chuck unit 30 which includes a tapered, recessed chuck element 31 carried on the outer end of a piston rod 32 of a reciprocating, fluid-pressure operated motor cylinder 33. The motor 33 is supported on a vertical bracket 34 attached to a horizontal member 35 on the machine frame. The motor 33 is internally spring loaded so as to be single acting and normally retracted. The neck chuck element 31 is engaged with the neck of bottle 12 upon the introduction of pressurized fluid in a pipe 36 at the outer end of the motor cylinder 33. The pipe 36 is in turn connected to a valve and source of fluid under pressure (not shown).

Opposite the neck chuck assembly 30 is a rotatably mounted center shaft 37. The shaft 37 has an outer end center pad 38 which, in a preferred form of construction, is a frusto-conical element, such as shown on FIGS. 4 and 5. The chuck mechanism, shown in detail on FIG. 3, is actually the unit employed at the decorating station 15. However, for ease of illustration, the chuck unit used at the pre-registration station is in nearly every respect identical and, therefore, will be described in connection with the details shown on FIG. 3. The shaft 37 is rotatably mounted in a base plate member 39 which is in turn journal mounted in a member 40 that is attached to the machine frame 16. Thus, at the station 13 where pre-registration occurs, the base plate member 39 may be rigidly mounted in the member 40 or rotatably adjustably mounted in the member 40, as shown on the drawings.

As a bottle 12 arrives at the pre-registering station 13, it is supported horizontally in the upright bifurcated members of the cradle 11 (FIG. 2). As mentioned, the neck chuck element 31 is formed with a tapered annulus that will receive the neck finish of the bottle. The base or bottom end of the bottle in the invention is molded with a central tapered recess 41 that is symmetrical with the central longitudinal axis of the container 12. The recess 41 may be of many shapes, such as frusto-conical, conical, a pyramid shape, etc., depending upon the molding requirement of the container. The centering pad 38 on the shaft 37 will, of course, have a corresponding shape to fit the center recess 41 on the bottle to be decorated.

In time with machine production, fluid under pressure is admitted to the pipe 36 of the neck chuck motor 33 to extend the neck chuck element 31 and engage the neck end of the bottle. Simultaneously with this manipulation, the center shaft 37 is extended so that it engages the tapered recess 41 in the bottom end of the bottle. The motor means for extending shaft 37 will be presently described. The neck of the bottle will be lifted along the tapered wall of the neck chuck annulus and simultaneously the bottom end of the bottle will be lifted by the engagement of the tapered pad 38 in the tapered recess 41. The bottle will now be free of the cradle 11 and supported between the end pressure elements comprised of the neck chuck element 31 and the center pad 38.

As seen on FIG. 3, the base plate member 39 is rotatably mounted in bearings 42 and 43 in the journal member 40. The plate member 39 has a sleeve portion 44 rotatably mounted in a bearing gland 45. The gland is held stationary with the journal member 40. The gland 45 has sealing rings 46 and 47 on the sleeve 44 at opposite sides of an annular groove 48. The annular groove 48 is in turn connected to a controlled supply of fluid under pressure by pipe 49. Sleeve 44 has a passageway 50 that connects groove 48 and a stepped cylinder chamber 51 in plate member 39, the axis of the cylinder 51 being disposed parallel with shaft 37. The cylinder reduces to a guideway 52 for a registration pin or finger 53. The registration pin has a tapered tip that is located radially to intercept a recess 56 (see FIGS. 4–7 and 9–12) in the bottom of the bottle 12. Attached at one end of the pin 53 is piston 54 slidable in the cylinder 51. Ahead of the piston 54, a coil spring 55 is compressed to normally force the piston to retract pin 53 in relation to the front face of the plate member 39. Pin 53 is outwardly extended from the plate member 39 by timed admission of pressurized fluid at the pipe inlet 49. The described axially shiftable pin 53 comprises one form of article registering means that is operable to engage an index or indicia portion, such as recess 56, on the exterior surface of the containers being decorated.

The center shaft 37 is extended and retracted by a reciprocating power means comprised of a fluid pressure operated cylinder motor 57 supported on horizontal rods or bolts 58 and 59 that extend from a boss 60 on the rear side of the journal member 40. The rods 58 and 59 are attached to the housing portion 61 of the motor (FIG. 1) and hold it in a stationary position. The motor 57 includes a sleeve 62 (FIG. 3) that is axially shiftable in a rotatable cylinder housing 63 threaded into the motor housing 61. The cylinder 63 has a sprocket 64 on its outer end, which provides a means for adjusting the position of the center pad 38. Sprocket 64 is in meshing engagement with the teeth of an idler gear 65 (FIG. 1) rotatably mounted on the housing 61. This gear 65 in turn meshes with a drive pinion 66 rotatable with a shaft 67 that is provided with an adjusting knob 68. This mechanism is shown on both chuck units at stations 13 and 15 on FIG. 1. Rotary movement of the knob 68 will rotate the sprocket 64 through the gear train 65 and 66. As the sprocket 64 rotates in one direction or the other, cylinder housing 63 of the motor 57 will be moved axially with respect to housing 61. This will adjust the relative position of center pad 38 in relation to the bottle and the head chuck unit.

Referring again to FIG. 3, the motor 57 includes a piston member 69 that is keyed at 70 and retained against a ball bearing 72 and a flange 71 so that the piston is securely attached to sleeve 62. The piston member 69 retains the ball bearing 72 which rotatably connects the threaded end of the shaft 37 to the piston of the motor by nut 73. Opposite the ball bearing is a spacer sleeve 74 on shaft 37. A pulley 75 is keyed onto the shaft 37 adjacent the outer end of sleeve 74. The end of the motor cylinder 63 is provided with a cap 76 and fluid pipe 77. Timed introduction of fluid under pressure in pipe 77 causes the motor piston consisting of 62, 69, 72, 73 and 74 to move collectively and axially shift shaft 37 and extend center pad 38. When pressure is released at the pipe 77, the piston and shaft 37 retract under force of the coil spring 78 that is compressed between the flange 71 on sleeve 62 and the rim 79 at the outer end of cylinder housing 63. The stroke of the motor piston is defined by cap 76 and the annular wall 80 on the cylinder housing 63.

The container is rotated by driving the pad 38 through shaft 37. A torque-limiting drive means is employed to enable stopping rotation of the bottle as the pin 53 and recess 56 engage. This drive means includes a coil spring endless belt 81 running on the pulley 75 on shaft 37 and the drive pulley 82 on the output shaft 83 of an electric motor 84. Motor 84 may be continuously or intermittently operated as desired to supply torque to the spring belt drive 81, which will rotatably drive the center shaft 37.

As the bottle is brought to the pre-register station 13, the neck chuck element 31 and center pad 38 are extended for center point support of the bottle. The manipulation of these elements may be achieved by the introduction of pressure fluid through the respective lines 36 and 77 of the two motors 33 and 57 at the pre-register station. Suitable controls of a known type may be provided for this purpose, such as the controls shown and described in the Jackson and Heyne Patent No. 2,365,961. These controls need not, therefore, be further explained herein since it would occur to one skilled in this field how to adopt the controls on the machine to achieve a timed introduction of fluid. At the time the bottle is supported between the neck element 31 and the pad 37, pressure fluid is introduced into the pipe 49 to extend the registration pin 53 into engagement with the bottom wall of the bottle. The above described torque-limiting drive means will rotate the center pad 38 which in turn will rotate the bottle 12. The bottom of the bottle will move relative to the extended pin until it engages the recess 56, as is shown on FIG. 4. At this time, the spring belt 81 will slip on the pulley 75, and since the plate member 39 is held in a predetermined stationary position, the bottle will be oriented in a registered position.

After the bottle has stopped rotation against the registration pin, the fluid pressure is released at the pipe 77, and simultaneously the pressure is released to the pipe 36 of the neck chuck motor returning the bottle to the cradle 11.

At the pre-registration station 13, FIG. 1 illustrates a means by which the plate member 39 may be held in a stationary position. A cylinder piston motor 85 is mounted on a bracket support 86 attached to the frame 16 of the machine. The piston rod of the motor has an end rack 87 that meshes with a pinion 88 keyed on the stop end of the sleeve 44 on the plate member. The rack and pinion will thus hold the plate member 39 in a set stationary position. However, this position may be changed between registrations so as to adjust the registering pin 53 in a desired rotary location. The purpose of this adjustment is disclosed in my co-pending application, Ser. No. 226,374, now Patent No. 3,146,704 entitled. "Decorating on Bottles and the Like." The rack 87 is operated upon introduction of pressure fluid in either of the end ports 89 and 90 of the motor cylinder 85. As an alternative construction, and because of its simplicity not being illustrated hereon, the sleeve portion 44 of the plate member 39 may be non-rotatably fixed in the journal housing 40 so that the pin 53 will be constantly set at a given position. This revision will only apply to the pre-register station 13. This construction will adapt the invention best to some of the known types of decorating machines. After the bottle has been returned to the cradle 11, the conveyor chain is moved step-by-step until the pre-registered container is at the final registering and decorating station 15. Insofar as this description is concerned,, the common parts of the mechanism at station 15 have applied to them the same numbers as in the just-described unit of the pre-registered station 13. The bottle is chucked as before by energizing the neck chuck motor 33 and the motor 57 simultaneously so that the container is picked up and supported by the neck chuck element 31 and center pad 38. At about the same time, fluid under pressure enters the pipe 49 and extends the registering pin against the bottom of the container. The center shaft 37 will now be rotated by the torque-limiting drive of belt 81 running on pulley 75. Belt 81 may be reeved over pulley 91 on the output shaft 92 of a rotary hydraulic motor 93. The motor 93 will enable alternate introduction of fluid into the ports 94 and 95 which provides rotation of drive pulley 91 in alternate directions. Rotation of center shaft 37 moves the bottom of the bottle past the registering pin 53 until it engages the recess 56. As above described, this will stop the bottle, which is now in its final registered position ready for decorating.

Referring to FIGS. 2 and 3, the arm 27 of the decorating screen drive is connected to positively rotate the plate member 39 and the pin 53 which in turn will drive the bottle while the screen 17 travels linearly in the stencil decorating operation. The peripheral speed of the bottle is pre-determined through the drive connection to be the same as the linear speed of the screen and hence asynchronized, rolling contact is maintained between bottle and screen. Pivotally mounted on the underside of the arm 27 is a connector block 96 which engages a channel shaped bar 97 attached to the slide bar 98. The latter is mounted to reciprocate lengthwise of the machine in a guideway formed in a stationary support 99. The slide bar 98 is provided at its lower face with a rack 100 that meshes with the pinion 88. This pinion, as was earlier described, is keyed on a stub end of the sleeve 44 of the plate member 39. Thusly the registering pin 53 and the screen carriage are mechanically interconnected, and it together with the plate member 39 are rotated concomitantly with movement of the decorating screen under power of the rock arm 27 driven by cam member 22.

As the screen is moved in rolling contact with the bottle, the squeegee 19 carried on an arm 101 is in its lowered position such that it holds the screen in engagement with the surface of the bottle. The squeegee arm 101 is pivotally mounted on a bracket 102 for raising and lowering movement about the pivot pin 103. The squeegee is held with a yielding pressure against the screen during decorating. The squeegee is lifted away from the screen at all times when the decorating is inactive.

By utilizing the just-described structure, decorating may be applied on containers to a point on their surface that is closely adjacent the bottom heel section without interference from a base chuck unit or similar mechanism.

As an alternate construction and further embodiment of the invention, reference is now made to FIG. 6. In this construction, the annular plate member 39 provided at the decorating station has a friction surface such as at 104, which comprises a facing of a high friction or deformable material. Examples of material which may be used are rubber, nylon, Teflon or fibrous compositions. This construction will provide a more positive drive for the bottle during decorating, achieved as followes. After the container is finally registered at the decorating station, as described above, the motor 57 is now operated to retract shaft 37 and center pad 38 to an extent that the bottle bottom bears against the facing 104. The center pad 38 will, however, remain engaged with the center recess 41 of the bottle and the registering pin 53 will likewise remain engaged with the registered indicia 56 at the bottom of the bottle. Positive pressure will likewise be applied in setting the bottle against the face 104 by fluid pressure on the piston of the motor 33 of the neck chuck unit.

A further embodiment of the invention is shown on FIG. 7. The center pad 38' is here illustrated to be of a different size, and more pointed in configuration than the earlier referred to center pad 38, such as shown on FIGS. 4–6. Correspondingly, the bottle is formed with a centered bottom recess 41' that is relatively small and pointed. These bottle constructions are also shown on FIGS. 9–12.

A further embodiment of the invention is illustrated on FIG. 8. The bottle supporting and rotating units at both the pre-register station 13 and the final registering station 15 are each constructed essentially the same, as described above, and common parts have the reference numerals applied to them. In this form of the invention, rotation of the bottle at either or both of the stations 13 or 15 is provided by a head chuck drive. This includes a pulley 105 keyed on neck chuck element 31. The pulley 105 receives a spring belt 106, constructed as the belt 81, that is driven by the drive pulley 107 of electric motor 108. The motor 108 is supported by its bracket 109 fastened on to the horizontal member 35 of the machine frame. The piston and piston rod of the neck chuck motor 33 is of course rotatable within the cylinder of the motor and thus the motor provides a journal mounting for rotation of the neck chuck element 31. This unit is also axially extensible, as described earlier for chucking the bottle. In the cycle of the machine, after the bottle is chucked between the neck element 31 and the center pad 38, the rotary drive means comprised of the belt 106, pulleys 105 and 107, and motor 108 rotate neck chuck element 31 until the registering pin 53 seats in the recess 56 at the bottom end of the bottle. This will stop the bottle in registered position and thereafter the belt 106 will slip on the pulley 105. The bottle may now be handled on the machine, as described earlier, to transfer it from the station 13 to the decorating station 15. When the bottle is again picked up and held at its ends by the element 31 and pad 38 at the station 15, the neck drive, just-described, will again operate to rotate the bottle until the registering pin 53 seats in bottle recess 56. The bottle will then be finally registered for decorating. Decorating is again achieved through the engagement of the rack 100 with the pinion 88, and the pin 53 or, as in the embodiment of FIG. 6, the pin 53 and facing 104 of the plate member 39 will rotate the bottle synchronously with movement of the screen 17.

During decorating, the belt 106 will slip on the neck chuck pulley 105.

Referring now to FIGS. 9 and 12, two forms of novel container of the present invention will be described. FIG. 9 illustrates a container 12 which has a neck finish 12a and a bottom wall 12b. The bottle 12 is molded with a central conical recess 41 which is frusto-conical in shape. The axis of the recess 41 is common to the center axis of the bottle and this forms a center point location for chucking the bottle in the apparatus above described. Also along the bottom wall of the bottle, is a molded registration recess 56. This recess as shown may be cylindrical, oval of or other suitable configuration, for co-operating engagement with a registering pin or finger.

FIGS. 10 and 11 illustrate another form of bottle 12 having a bottom wall 12b and central recess 41'. Recess 41' is cone shaped and is more suitable for molding in some types of bottles, especially the smaller sized ware. The bottle also is provided with a molded registration recess 56 in the bottom wall 12b.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In a decorating machine for screen-squeegee type application of a color decoration on a round container, the combination of a frame mounting the screen-squeegee mechanism at a decorating station, means for carrying the container into and out of the decorating station, first means for rotatably supporting the container at the decorating station independently of said container carrying means, and a means for rotatably registering the container held in said first means with respect to said screen-squeegee mechanism, said first means comprising a head chuck and an axially shiftable conically-shaped center member coaxially and rotatably mounted on said frame opposite said head chuck, said rotatable registering means comprising an annular base plate member mounted concentric with and rotatable independently of said center member, an axially extensible registering member mounted on said annular base plate member in a predetermined rotational position with respect to the container and a predetermined position in relation to the screen of said mechanism, means interconnecting said screen and said annular base plate member for synchronous movement together, said registering member being aligned radially to engage a registration indicia portion on the bottom of the container, yieldable means for extending the registering member, means for extending and retracting said center member into and out of engagement with the bottom end of the container in rotatably supporting the latter, and drive means for rotating the container while end supported on said first supporting means to cause engagement of the registering member and the registration indicia of the container, said drive means including means being responsive to engagement of said registering member and said indicia of the container for stopping the rotation of the latter to present it in a registered position with relation to the screen-squeegee decorating mechanism.

2. The machine defined in claim 1, wherein the means responsive to engagement of said registering member of the drive means for registering the container comprises a torque-limiting rotary drive connection to the head chuck.

3. The machine defined in claim 1, wherein the means responsive to engagement of said registering member of the drive means for registering the container comprises a torque-limiting rotary drive connection to the center pad.

4. In a decorating machine for decorating articles of revolution by the silk-screen process, a reference positioning device comprising an annular base plate, a friction surface on said annular base plate facing the bottom portion of an article to be decorated, a head chuck, a registering member shiftably mounted on said base plate, a center shaft and end member mounted for axial and rotational movement with respect to said base plate, means connected to said pad for axially shifting it so that the article is gripped between it and said head chuck, and torque-limiting drive means connected to said pad for rotating it, the last two means being operated in sequence such that the center pad is axially shifted to grip the article, said pad being rotated to orient the article with respect to the registering member and engage the latter, whereby the article is held in registered position against further rotational movement, the means for shifting said end member being operated whereby said end member is withdrawn toward the base after the article achieves its registered position.

5. In a decorating machine including a decorating mechanism at a decorating station, in combination a head chuck including a rotary mounted element, a shaft, means rotatably and axially shiftably mounting the shaft coaxially with said head chuck element, a tapered center pad on said shaft, a drive means connected to said shaft for axially moving the pad into engagement with the container bottom to support the container for axial rotation, rotary drive means connected to rotate said container, a registering member, rotatably mounted support means for said registering member comprising an annular plate facing the bottom of the container, the face of said plate adjacent the bottle being provided with a friction surface, said registering member comprising a pin mounted on said rotatable element for axial movement, means for moving the pin into and out of engagement with the bottom wall of the container for engagement with a registration element thereon, whereupon rotation of said container is stopped at a predetermined rotative position for registration of the container with the decorating mechanism, the axial drive means for the shaft being operable to withdraw said pad and seat the bottom of the container on the plate so that, during decorating, the container is drivable by the combination of the friction surface of the annular plate and the engaged registering pin, a drive connection between said decorating mechanism and said annular plate for simultaneous synchronous movement of the container and the decorating mechanism.

6. In the machine defined by claim 5, the said rotary drive means includes a torque-limiting drive connection to the head chuck element for rotating the container, the shaft and pad being freely rotatable.

7. In the machine defined by claim 5, the said rotary drive means including a torque-limiting drive connection to the shaft for rotating the container, the head chuck element being freely rotatable.

8. In the machine defined by claim 5, the said friction surface being of a deformable material.

References Cited

UNITED STATES PATENTS

| | | | |
|---|---|---|---|
| 1,930,153 | 10/1933 | Smith et al. | 101—124 |
| 2,126,465 | 8/1938 | Hilgenberg | 215—1 |
| 2,132,818 | 10/1938 | Cone | 101—115 |
| 2,231,535 | 2/1941 | Jackson et al. | 101—115 |
| 2,540,554 | 2/1951 | Shurley | 101—38 |
| 2,553,085 | 5/1951 | Groce | 101—124 X |
| 2,721,516 | 10/1955 | Campbell et al. | 101—126 X |
| 2,724,329 | 11/1955 | Lucas | 101—126 |
| 2,739,531 | 3/1956 | Hagerman | 101—126 |
| 2,882,818 | 4/1959 | Vowles | 101—126 |
| 2,951,440 | 9/1960 | Dubuit | 101—126 |
| 3,031,095 | 4/1962 | Loughran | 215—1 |
| 3,089,414 | 5/1963 | Jenkins | 101—124 |
| 3,135,194 | 6/1964 | Hollows | 101—38 |
| 3,139,824 | 7/1964 | Derrickson | 101—124 |

ROBERT E. PULFREY, *Primary Examiner.*

WILLIAM B. PENN, *Examiner.*

J. R. KING, N. A. HUMPHRIES, W. F. McCARTHY, H. P. EWELL, *Assistant Examiners.*